United States Patent Office 2,964,407
Patented Dec. 13, 1960

2,964,407

DRIED FAT-CONTAINING MILK PRODUCTS OF EASY DISPERSIBILITY

Howard I. Sinnamon, Philadelphia, Nicholas C. Aceto, Roslyn, and Roderick K. Eskew, Glenside, Pa., assignors to the United States of America as represented by the Secretary of Agriculture No Drawing. Filed Feb. 4, 1957, Ser. No. 638,177

8 Claims. (Cl. 99—56)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This application is a continuation-in-part of our copending application entitled "Process for Making Rapidly Dispersible Dried Whole Milk," filed February 7, 1956, Serial Number 564,084, now abandoned.

This invention relates to a process for preparing dried fat-containing milk products wherein substantially each fat globule of said products being of very small size is occluded in a readily dispersible non-fat matrix and resulting in products whose proteins have not been substantially altered in the process, whose flavor remains substantially unchanged during the processing and which products are readily dispersible in water just above its freezing point (hereinafter referred to as ice water) at which temperature butterfat is solidified.

It has heretofore been impractical to manufacture dried fat-containing milk products with rapid dispersibility in ice water without mechanical agitation and possessing good flavor. These products include, for example, dry whole milks. Naturally the composition of whole milk powder necessarily varies according to the composition of the original milk. As stated in volume 2, page 843, "The Chemistry and Technology of Food and Food Products," by Jacobs, 1951 edition, published by Interscience Publishers, Inc., of New York, milk can contain as high as 7.8% fat and total solids of 18% corresponding to a fat content in the dried product of 43.3%. The minimum legal fat content of dried whole milk is 26% on a moisture-free basis.

Dried milk products are generally made by spray and roller drying. Spray drying is prejudicial to good keeping properties because of the oxygen trapped inside of the dried particles. Furthermore, spray dried products are fine powders which tend to float and to cake when reconstituted with water. Even though some spray dried fat-containing milk products such as whole milk powder can be agglomerated by recently developed processes to overcome their powdery nature, they do not possess the attribute of easy and rapid dispersibility in cold water. The market for dried whole milk, for example, has been restricted because of difficulties in dispersibility. The roller dried product is usually worse in this regard than the spray dried product. Spray and roller drying of milk causes alteration of the heat sensitive milk proteins as evidenced by the solubility index tests (described in the American Dry Milk Institute, bulletin 911), or by ultracentrifugal behavior of the whey proteins. This inevitably results in a reconstituted product different from the parent milk.

We have discovered a new and useful process for making dried fat-containing milk products, for example, dried whole milk, which is readily dispersible even in ice water (a temperature well below the melting point of the butterfat) and whose constituents and flavor are not substantially altered in the process, and thus admirably suited for beverage purposes. Another unique feature of the process is that it yields a product which retains its good dispersibility even after prolonged storage.

In its broadest aspect, the invention provides a process for making a dried fat-containing milk product which involves drying a concentrated, homogenized, fat-containing milk, such as whole milk, a flavored fat-containing milk, a fat-containing milk with added lactose, and which includes also a fat-containing milk in which the fat may be other than butterfat, such as skim milk containing a refined edible-grade cottonseed oil, the fat particles in said fat-containing milk not exceeding about 2 microns in size, at a temperature and pressure to cause the concentrate to expand and produce a cellular product readily dispersible by hand stirring in cold water without fat separation. The use of a temperature not exceeding about 55° F. is preferred.

A preferred process for making the dried fat-containing milk product involves incorporating an inert gas of low solubility into a concentrated, homogenized, fat-containing milk, of the type described above, in which the fat particles do not exceed about 2 microns in size, subjecting said gas-containing milk concentrate to conditions of temperature and pressure, preferably to subatmospheric pressure and a temperature not exceeding about 55° F., to prevent substantial evolution of gas while causing the concentrate to foam or puff, and then drying the foamed concentrate to produce a dry cellular product readily dispersible by hand stirring in cold water without fat separation.

In carrying out the invention, a fat-containing milk, such as that described above, is concentrated to a solids content above about 35%, preferably between about 40% and 60%, the resulting concentrate, preferably after incorporating therein an inert gas of low solubility such as nitrogen, is then homogenized to disperse substantially all fat particles to a size not exceeding about 2 microns, the homogenized concentrate is chilled to a temperature not exceeding about 55° F., and the chilled, homogenized concentrate is thereafter dried, preferably by puff drying, to produce a product which is readily dispersible by hand stirring in 38° F. water.

In our preferred manner of carrying out the invention, the fat-containing milk is vacuum concentrated below a temperature at which the milk proteins are substantially altered, that is, not exceeding about 135° F., preferably not exceeding about 100° F., and to a solids content between about 40 and 60%, preferably to a solids content between 40 and 50%. Prior to such vacuum concentration the milk may be pasteurized, if desired, by a process resulting in a minimum of protein denaturation in the starting material, and if desired also, the resulting pasteurized milk may be conventionally homogenized. However, both the pasteurization and homogenization procedures are optional.

The vacuum concentrated milk, preferably after impregnation with an inert gas, such as a gas of low solubility like nitrogen, or one of high solubility like carbon dioxide and nitrous oxide, is homogenized to disperse substantially all fat particles to a size not exceeding about 2 microns, the gas, if it had been used, being simultaneously dispersed.

The resulting homogenized milk concentrate, after being chilled to a temperature not exceeding about 55° F., is thereafter expanded and dried, in a vacuum drier, preferably under an absolute pressure not exceeding about 11 millimeters of mercury and at a product temperature not exceeding about 150° F. to avoid denaturing the proteins contained therein, thereby producing expanded and dried products of cellular form in which substantially each fat globule of the dried fat-containing products is occluded in a readily dispersible non-fat matrix. The application of the vacuum and heat causes a tremendous expansion in volume of at least about 25 times, and up to as high as 60 times, of the volume of the homogenized concentrate, and the resulting puffed product, which in its preferred form, is composed of a very large number of thin walled bubbles with a minimum of unpuffed material between the bubbles, retains its porous structure until the desired drying is obtained. The inert gas of such solubility, if present, aids in achieving the puffing and produces a more uniform and desirable product than results from the use of a homogenized concentrate containing no gas. Where no gas has been added, the puff which results is caused by the water vapor evolved.

The resulting product is a dried fat-containing milk product which is readily dispersible by hand stirring in 38° F. water without fat separation.

If desired, the foregoing described process can be employed to make dried fat-containing milk products having altered proteins by applying it to fat-containing milks having altered proteins.

The process comprises carrying out a series of steps which in combination and within specified limits results in novel and commercially valuable products. When making dried whole milk, for example, pasteurization of the starting material is preferred, but is optional. If pasteurization is employed a method should preferably be used that results in a minimum of protein denaturation in the starting material, for example, in one well-known method, the milk is rapidly heated to about 162° F. and the milk is kept at that temperature for 16 seconds, and the milk is then rapidly cooled. This milk may be optionally homogenized in the usual commercial manner. This is concentrated under vacuum such that its temperature does not exceed 135° F. and preferably does not exceed 100° F., to a solids content between 40 and 50%. Concentrations above 50% may be used but the tendency for the concentrate to gel makes such use impractical. Concentrations below 40% may also be used but serve no useful purpose since the cost of water removal by drying is greater than by evaporation. The concentrated milk at 135° F., preferably after impregnation with an inert gas of low solubility such as nitrogen, is homogenized at high pressure to finely disperse the fat and gas. A pressure of 4000 to 5000 pounds per square inch is desirably used and more than one pass may be required; a lower pressure, e.g., 500 pounds per square inch is customarily employed in the second pass. It is preferable in homogenization to assure that substantially no fat particles remain in a size exceeding about 2 microns. This is a more thorough homogenization than is customarily done with single strength milk. This extreme homogenization is an important feature of the process as it is a factor in preventing fat separation on reconstitution.

It generally is desirable to introduce an inert gas of low solubility prior to homogenization depending on the conditions to be used in drying the concentrate. The introduction of gas at this point results in its dispersion during homogenization in such a way as to achieve the desired uniform fine grained puff or foam in the drying process. It is not necessary to introduce a gas to achieve puffing but a gas, for example, such as nitrogen produces a more uniform and desirable product than results from the use of a concentrate containing no gas. If no gas is added, and none was entrained in processing, the puff which results will be caused by the water vapor evolved. As mentioned above this imparts a less desirable physical form to the product. The preferred puff consists of a very large number of thin walled bubbles with a minimum of unpuffed material between the bubbles.

The homogenized concentrate is then chilled to a temperature not exceeding about 55° F. One of the functions of this step is to create the desirable foam structure and to permit its becoming sufficiently rigid before the subsequent application of heat with concomitant evolution of vapor. A second function is to keep the fat in a solid phase during the time the foam structure is being formed, thereby facilitating its occlusion in a non-fat matrix.

The next step is to dry the chilled, homogenized concentrate at a product temperature not exceeding preferably about 150° F. to avoid denaturing proteins. It is also essential that the vacuum and heat be applied in such a way as to cause a tremendous expansion in volume and assure that the puffed product retains its porous structure until the desired dryness is obtained. The puffing required for whole milk, for example, is much greater than that used in puff drying materials such as coffee and fruit juice. Preferably, and as one example, the volume of the dried puffed concentrate is at least 20 to 25 times the volume of the homogenized concentrate and can desirably be as great as 60-fold that of the homogenized concentrate.

Another aid in obtaining a puff is to employ a gas of high solubility in the concentrate, such as $N_2O$ or $CO_2$. However, we prefer an inert gas of low solubility.

The dry product is a dried, fat-containing milk product which is readily dispersible by hand stirring in 38° F. water. For convenience in handling and reduction of packaging costs, the product may be crushed or otherwise broken in a way to minimize the development of fines although such comminution impairs its dispersibility rate in 38° F. water. Material which will just pass a 20-mesh screen is desirable as a compromise between convenience of handling and dispersibility rate in 38° F. water. If this whole milk powder is placed on the surface of cold water "comet tails" of dispersed milk develop as the particles fall through the water, illustrating the rapid dispersibility of the product. This unique dispersibility is easily demonstrated by observing, with a 50 power stereoscopic microscope, what happens when a drop of cold water touches the product. Within a few seconds all particle boundaries disappear; only milkiness remains. In contrast to this a spray dried product, even if given the so-called "instantizing treatment" of commerce during manufacture merely swells into gelatinous particles with substantially no milkiness visible.

As one important feature of this invention, our improved dried whole milk, for example, can be easily substantially wholly dispersed in water to make a reconstituted whole milk by ordinary hand stirring as with a spoon, in ice water.

In one test (by a dispersibility rate test recently developed by the U.S.D.A. and soon to be published) ordinary commercial spray dried whole milk powder was mixed with water at 38° F. by ordinary hand stirring with a spoon, in an attempt to make a reconstituted whole milk. After thus stirring for two minutes only about 85% by weight of the spray-dried whole milk powder was dissolved or dispersed in the water. This test was also made with the improved dried whole milk also by mixing at 38° F. In about 90 seconds of the same hand stirring with a spoon all the improved whole milk powder substantially completely dispersed in the water, thus making a superior cold reconstituted whole milk ready for immediate consumption.

Important factors in obtaining, by our process, a product, for example, a dried whole milk capable of easy dispersion in ice water, at which temperature the fat is solidified, are thorough fat and gas dispersion during homogenization, a high degree of expansion and a uniform structure on drying and combining these with drying conditions to substantially avoid protein denaturation and to ensure occlusion of substanitally each fat globule in a readily dispersible non-fat matrix.

An example of how the process may be carried out on whole milk is as follows.

Example I

Fresh whole milk is homogenized in the conventional way and pasteurized by heating to 162° F. and holding at that temperature for 16 seconds, thereafter rapidly cooling. This is evaporated under vacuum of 28½" mercury to 48½% solids. The concentrate is then heated to 135° F. and nitrogen gas is introduced into the concentrate just ahead of the homogenizer, in such quantity as to cause each gallon of concentrate to expand to approximately 1.3 gallons. The concentrate is homogenized at 4000 pounds per square inch pressure on the first pass and at 500 pounds per square inch on the second pass. The concentrate is then spread in stainless steel trays with a loading of 0.386 pound of concentrate per square foot of tray bottom. The trays and product are then cooled to a temperature of 52° F. and placed in a vacuum tray drier. No heat is applied in the platens at this stage. A vacuum is drawn on the chamber. At about 10 millimeters gas evolution will begin, causing a volume increase which progresses as the vacuum increases reaching a maximum at about 6 millimeters. The increase in volume is aproximately 50-fold. When the pressure falls below about 8 millimeters evaporation begins with a further cooling of the concentrate. At 6 millimeters 185° F. water is circulated through the platens. This usually causes some reduction in the volume of the puff but the volume should remain well above 25-fold with respect to the concentrate. Circulation of 185° water is continued in the platens until the product temperature as measured by a thermocouple approaches 100° F. At this point platen water temperature is reduced so as not to permit product temperature to exceed about 100° F. The pressure is caused to drop to approximately 1.3 millimeters and is held there for the remainder of the drying cycle. Drying is complete in approximately 1¾ hours from the time of charging. Prior to breaking of the vacuum and removing the product, cold water is circulated through the platen to cool the product.

The principles of the process described in Example I, above, for whole milk are also applicable, with minor modifications, to other fat-containing milk products, as will be shown.

Various recipes for preparing chocolate-flavored milk are reported in the literature (c.f. Whittier and Webb, "Byproducts From Milk," pages 27–30, Reinhold Publishing Corp., New York, New York, 1950; and Bennett, "The Chemical Formulary," 2nd ed., vol. IV, pages 45 and 126, Chemical Publishing Co., Inc., New York, New York, 1940). These formulations consist of skim or whole milk, cocoa, sucrose, small amounts of other flavoring materials and stabilizers.

Example II

One and seven tenths pounds of a commercially available chocolate flavoring powder consisting of cocoa (Dutch processed), sucrose, salt, lecithin, aritficial vanilla and other flavorings are added to 42½ pounds of whole, pasteurized, homogenized milk, thoroughly mixed and then concentrated in a falling film evaporator under 28½ inches of mercury to a solids content of 50.7% solids. The rest of the procedure is the same as for Example I.

After crushing through a 20-mesh screen, the product resulting from Example II will disperse readily with hand stirring in ice water to make a palatable and nutritious chocolate flavored milk ready for immediate consumption. The product was substantially completely dispersed in 80 seconds.

That our process can also be applied to lactose-enriched milk for infant feeding is illustrated in the next example.

Example III

Two and one quarter pounds of powdered lactose are dissolved with stirring in 42½ pounds of whole, pasteurized, homogenized milk and then concentrated in a falling film evaporator under 28½ inches of mercury to a solids content of 55.4%. The rest of the procedure is the same as for Example I.

The product from the foregoing Example III was dispersible in water with much greater rapidity than when prepared by conventional methods.

Our process is also applicable to milks containing fats other than butterfat.

Example IV

One and four-tenths pounds of refined, edible-grade cottonseed oil are added to 40 pounds of pasteurized skim milk. The mixture is homogenized at 3000 p.s.i. The homogenized mixture is then concentrated in a falling film evaporator under 28½ inches of mercury to a solids content of 47.8%. The rest of the procedure is the same as for Example I.

The powder from Example IV was readily dispersible in a manner similar to that described for the other fat-containing milks.

Although we have described fat-containng milk products whose proteins were not substantially modified (since they obviously possess the highest rates of dispersibility) our process can also be beneficially applied to fat-containing milks whose proteins have been previously altered, either by severe pasteurization or by acid addition as done in making infant foods of low curd tension.

Example V

Whole milk is homogenized in the conventional way and then pasteurized for 15 minutes at 190° F. It is then treated as in Example I.

Example VI

A formulation of the following ingredients is prepared:

| | Pounds |
|---|---|
| Pasteurized and homogenized whole milk | 42¼ |
| Dextrin-maltose | 1¼ |
| Sucrose | 1¼ |
| Corn starch | 0.8 |
| Lactic acid (85% aqueous soln.) | ¼ |

A thin paste is made by mixing the corn starch with about 1½ pounds of the whole mlik. The milk is warmed to about 90° F. and the sucrose and dextrin-maltose are dissolved. The corn starch paste is then added and thoroughly mixed. Finally the lactic acid solution is added. The modified milk is then concentrated in a falling film evaporator under a vacuum of 28½ inches of mercury to a solids content of 37.7%. The rest of the procedure is the same as for Example I.

Products prepared according to Examples V and VI were much more readily dispersible than were similar products prepared by conventional spray drying.

From the foregoing examples it is obvious that the principles disclosed here apply equally well to a continuous drier of the type customarily employed for coffee and fruit juices. Such a drier would comprise a solid moving belt operating continuously inside of a vacuum chamber with means for applying the previously prepared concentrate to the belt, heating it to accomplish the desired drying, chilling if necessary, continually removing the dried product from the belt and discharging it from the vacuum chamber without breaking the vacuum. A drier of this general type is described in "Drying and Dehydration of Foods," Harry W. von Loesecke, 2d edition, 1955, published by Reinhold Publishing Corp., New York. The practicability of converting vacuum batch drying operations to large-scale commercial drying in the above described type of drier has been repeatedly demonstrated.

We claim:

1. A process for making a dried fat-containing milk product comprising subjecting a concentrated, homogenized, fat-containing milk in which the fat particles do not exceed about 2 microns in size to conditions of temperature and pressure to prevent substantial evolution of gas while causing the concentrate to foam, and then drying the foamed concentrate to produce a dry cellular product readily dispersible by hand stirring in cold water without fat separation.

2. A process for making a dried fat-containing milk product comprising subjecting a concentrated, homogenized fat-containing milk in which the fat particles do not exceed about 2 microns in size to a temperature not exceeding about 55° F. and conditions of pressure to prevent substantial evolution of gas while causing the concentrate to foam, and then drying the foamed concentrate to produce a dry cellular product readily dispersible in cold water without fat separation.

3. A process for making a dried fat-containing milk product comprising incorporating an inert gas of low solubility into a concentrated, homogenized, fat-containing milk in which the fat particles do not exceed about 2 microns in size; subjecting said gas-containing milk concentrate to conditions of temperature and pressure to prevent substantial evolution of gas while causing the concentrate to foam; and then drying the foamed concentrate to produce a dry cellular product readily dispersible by hand stirring in cold water without fat separation.

4. The process of claim 3 wherein the gas-containing milk concentrate is subjected to subatmospheric pressure and a temperature not exceeding about 55° F. to prevent substantial evolution of gas while causing the concentrate to foam.

5. The process of claim 3 wherein the fat-containing milk is whole milk.

6. The process of claim 3 wherein the fat-containing milk is a flavored fat-containing milk.

7. The process of claim 3 wherein the fat-containing milk is a fat-containing milk with added lactose.

8. The process of claim 3 wherein the fat of the fat-containing milk is an edible-grade vegetable oil.

References Cited in the file of this patent

UNITED STATES PATENTS

| Re. 14,567 | Campbell | Dec. 17, 1918 |
| 783,015 | Britt | Feb. 21, 1905 |
| 843,938 | Glas | Feb. 12, 1907 |
| 1,851,988 | Scott | Apr. 5, 1932 |
| 2,087,962 | Ball | July 27, 1937 |
| 2,806,796 | Dorsey | Sept. 17, 1957 |

FOREIGN PATENTS

| 1,848 | Great Britain | May 2, 1876 |
| 6,720 | Great Britain | 1904 |